M. A. DUQUETT.
CHAIN PIPE WRENCH.
APPLICATION FILED JULY 20, 1911.
1,043,813.
Patented Nov. 12, 1912.
3 SHEETS—SHEET 1.
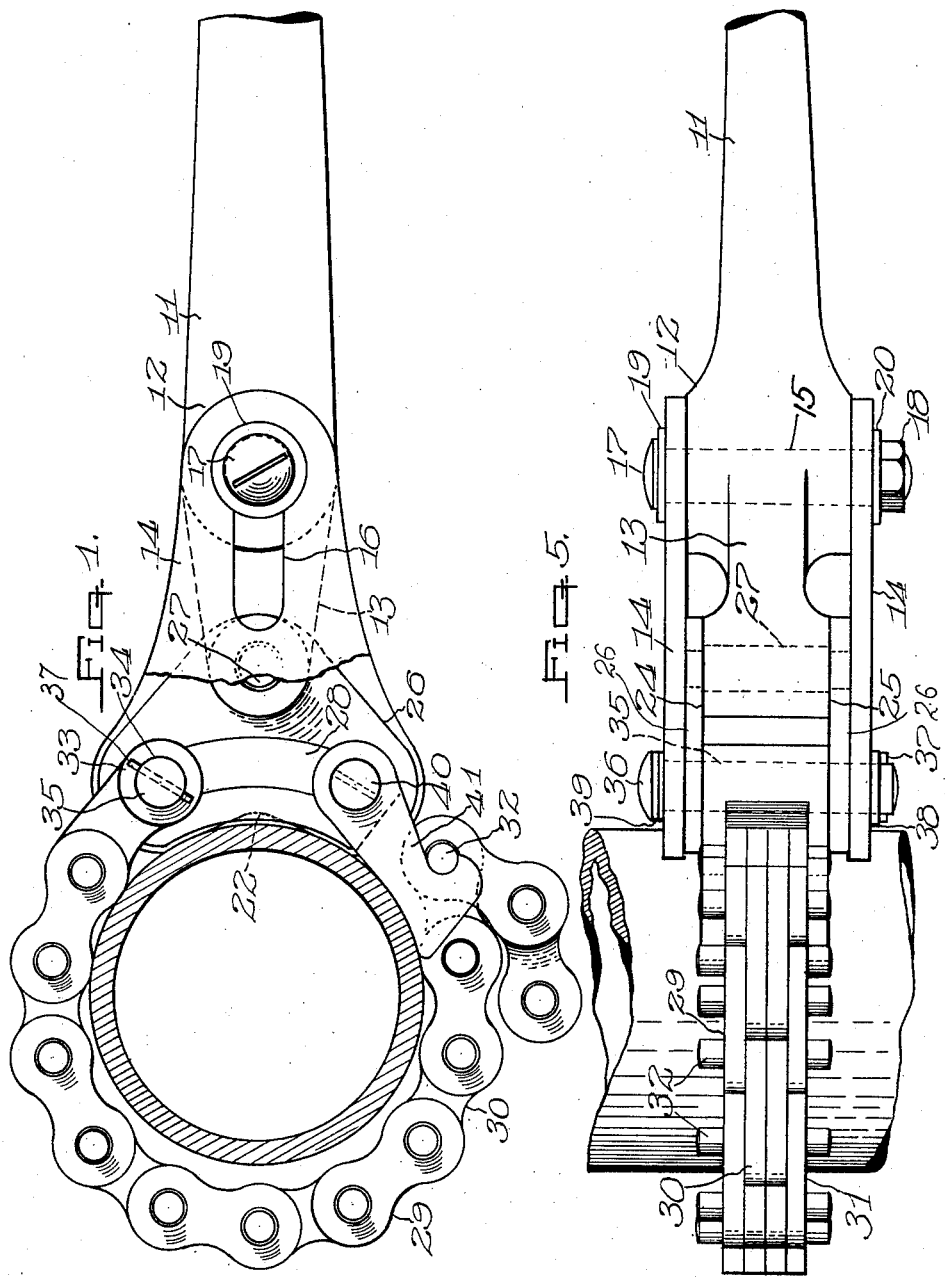

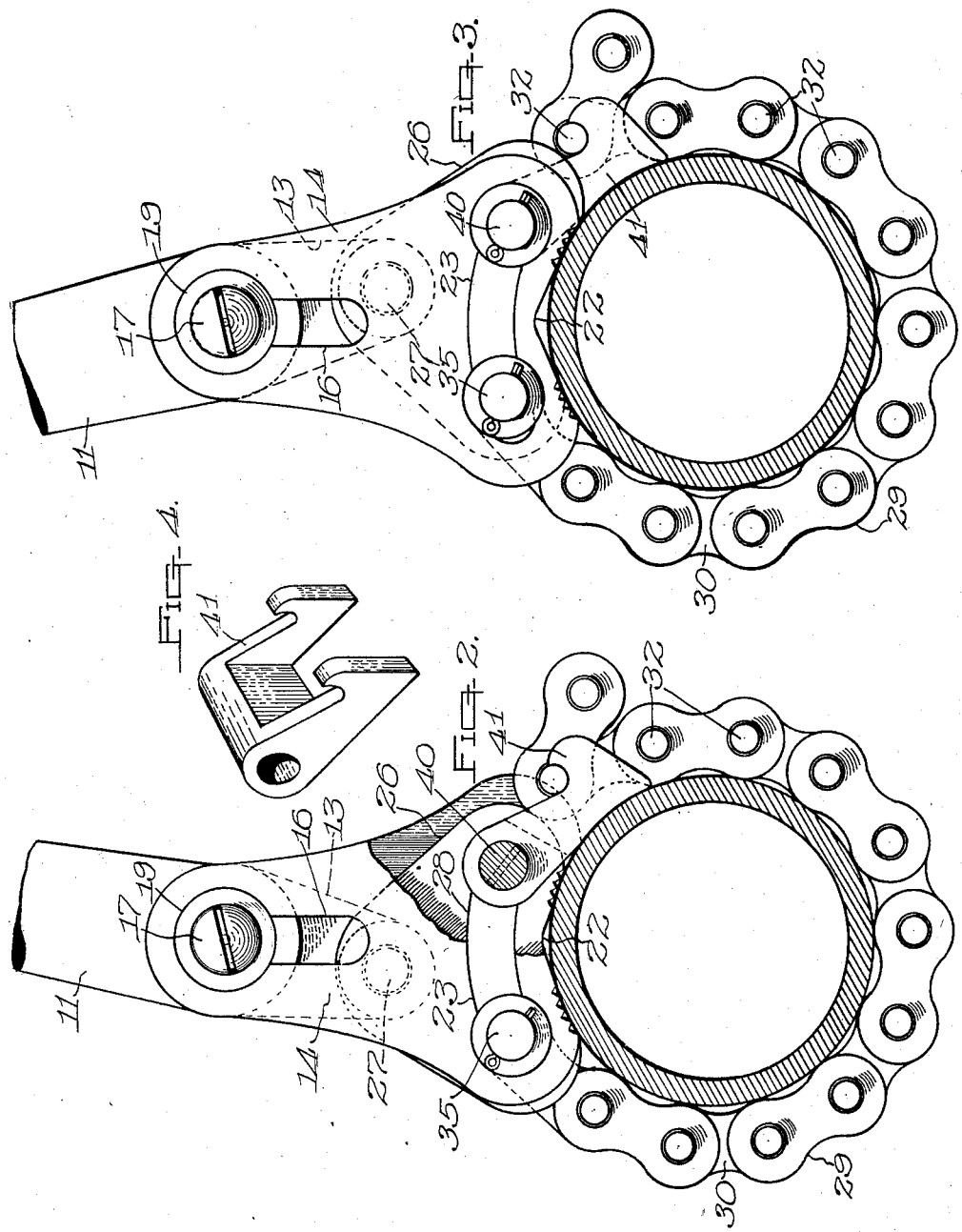

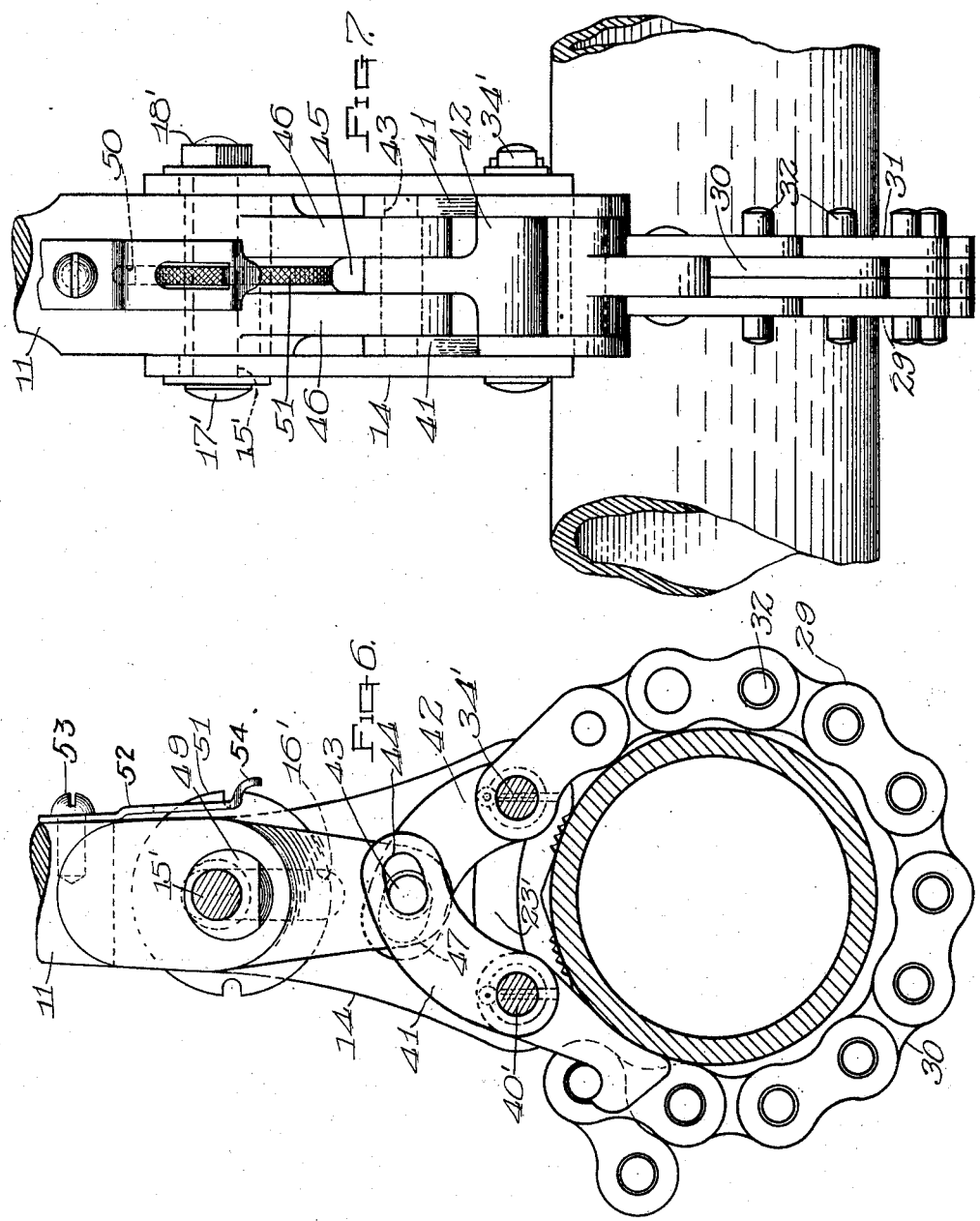

UNITED STATES PATENT OFFICE.

MAXIM A. DUQUETT, OF TOLEDO, OHIO, ASSIGNOR OF ONE-HALF TO JASON A. BARBER, OF TOLEDO, OHIO.

CHAIN PIPE-WRENCH.

1,043,813.  Specification of Letters Patent.  Patented Nov. 12, 1912.

Application filed July 20, 1911. Serial No. 639,602.

*To all whom it may concern:*

Be it known that I, MAXIM A. DUQUETT, a citizen of the United States, residing at Toledo, in the county of Lucas and State of Ohio, have invented certain new and useful Improvements in Chain Pipe-Wrenches, of which the following is a specification.

Tools of this character include a handle or lever and a chain, the latter element being adapted to encircle the article to be manipulated whether pipe or other similar object, and to be so connected to the lever that the swinging of the latter in the direction to turn the pipe causes the chain to clench or tighten about the pipe and grip it so firmly that it moves with the wrench. One of the objections, however, to this, as well as to most other forms of pipe wrench in common use is that a loop of chain must be secured around the object to be turned with a view to the direction in which rotation is desired and if it for any reason be desired to reverse the rotation, the wrench must be disconnected from the pipe and its position thereon reversed. The pipes in connection with which these wrenches are employed are usually of considerable diameter and consequently heavy and frequently are in awkward positions to handle as in the case of mains being laid in narrow ditches. It often happens that by reason of a slight angularity between two sections of the pipe which are being joined the threads do not mate or become crossed so that it is necessary to reverse the direction of rotation to withdraw the pipe and secure a new start. With the old form of wrench in order to accomplish this purpose it was necessary, as above explained, to detach it from the pipe and re-attach it in the reverse direction before the pipe could be unscrewed and withdrawn. With my wrench, on the contrary, it is only necessary to reverse the movement of the handle in order to reverse the direction of rotation of the pipe being manipulated. The saving in time and other advantages of the wrench in this respect are obvious. While I regard the above feature of my wrench the most important, it embodies other features of advantage and improvement which will be revealed in the course of the following detailed description but it is to be understood that, while I have in the following pages described in detail certain specific forms of my invention as illustrations thereof, I am not limited to such devices but my invention includes all forms of devices covered by the following claims and the fair equivalents thereof.

In the drawings accompanying this specification and forming a part thereof, Figures 1 to 5 inclusive illustrate the invention in one of its simpler forms, Fig. 1 being a side elevation with parts broken away to show the structure, the wrench being shown as applied to a pipe which is illustrated in section, and the handle as occupying a central position; Fig. 2 is a view similar to Fig. 1 but with the handle thrown to the right; Fig. 3 is a similar view with the handle thrown to the left; Fig. 4 is a detail of the hook for securing the free end of the chain; Fig. 5 is an edge view of the wrench, that is to say, a view at right angles to the plane of Figs. 1, 2 and 3; Figs. 6 and 7 are views of a modification, Fig. 6 representing an elevation similar to Fig. 1 but with parts in section to show the interior construction while Fig. 7 is an edge view similar to Fig. 5.

In the following description and in the several views like characters of reference are used to indicate the same parts throughout.

Referring now to the illustrative example delineated in Figs. 1 to 5 inclusive, the handle or lever 11 is seen to be formed with an enlarged head or hub 12 and a tapered short arm 13. The lever is fulcrumed on side plates 14—14 forming fulcrum supports by means of a pin or journal 15 extending through slots 16—16 in the side plates and provided with a head 17 at one end and a nut 18 at the other, suitable washers 19—20 being provided beneath the head 17 and nut 18 respectively. The side plates 14 are generally triangular in shape with the corners rounded and the short sides or bases of the triangles are formed on a reëntrant curve 22 to form a firm bearing upon a cylindrical or similarly shaped object. Each fulcrum support or side plate is formed with a transverse slot 23 extending substantially parallel to the base of the triangle for a purpose which will appear. The short arm of the lever 13 is cut away upon opposite faces 24—25 (see Fig. 5) to a less diameter than the hub or head 12 of the lever, and between the faces 24—25 and the inner faces of the fulcrum supports 14 are inserted triangular links 26—26 which are pivoted at their obtuse angles by means of a pivot 27 to the short arm of the lever (see Fig. 1). Adjacent and substantially parallel to that side of the links 26 opposite the pivot 27 are formed transverse slots 28 (see Figs. 1 and 2) similar in all respects and of equal length to the transverse slots in the fulcrum supports.

The chain 29 is or may be of familiar form comprising pairs of central links 30 connected at their ends by side links 31 but the pivots by which the links are connected project in the form of heads 32 at either side of the chain for a purpose which will be explained and as shown in Fig. 5. It will be obvious of course that single links may take the place of the central pairs of links shown in Fig. 5. The final link upon one end of the chain is formed with an enlarged barrel 33 which is received between the triangular links 26 and is centrally counterbored as at 34 for the reception of a pin 35, shown in dotted lines in Fig. 5, which extends at opposite ends through the slots 23 and 28 formed in the fulcrum supports and triangular links respectively, and is provided with a head 36 upon one end and a cotter pin 37 at the other end, suitable washers 38—39 being interposed between the head and cotter pin respectively and the fulcrum supports. A second pin 40 similar in all respects to the pin 35 extends through the slots 23—28 and supports between links 26 a bifurcated hook member 41 for engaging the other end of the chain.

It will be obvious that in applying my wrench to the object to be manipulated the bases of the fulcrum supports are applied thereto and the lever or handle brought to the central position whereupon the chain may be thrown around the pipe or other object to be turned and the hook members secured to the ends of that one of the link pivots which permits the least slack in the chain. The surplus chain may be permitted to dangle and has no function in the operation of the wrench. A motion of the wrench handle in either direction will cause a relative movement between the triangular links and the fulcrum supports, parallel to the slots and guided by the motion of the pins relative thereto, and this movement of the parts by bringing more closely together the pins 35—40 carrying the ends of the chain, tightens the latter so that it firmly grips the pipe or other object to be turned. After all the slack has been taken up in the chain and the pipe is firmly gripped thereby, further movement of the handle in the same direction as will be seen, must result in the turning of the pipe. The action of the wrench is well shown in Figs. 2 and 3. In Fig. 2, for example, the handle is shown swung to the right. This carries the shorter arm of the lever to the left and brings the ends of the slots in the triangular links in contact with the ends of the rod 40 carrying the chain-engaging hook 41, the slots in the fulcrum supports permitting this movement. At the same time the pin 35 at the left carrying the end of the chain is engaged by the ends of the slots 23 in the fulcrum supports, the triangular links having a lost motion with reference to this pivot by reason of the slots 28. If, however, it be desired to turn the pipe in the opposite direction it is merely necessary to reverse the throw of the handle as seen in Fig. 3 when the parts operate in the reverse manner, that is to say, the links 26 then carry the pin 35 out of the ends of the slots 23 and the pin 40 is held in the ends of the slots 23 but is released by the ends of the slots in the links 26. Lost motion between the handle or lever and the triangular actuating links is provided in this form by the slots 16 in the fulcrum supports though it will be obvious that it might otherwise be taken care of. In order to release the chain it is only necessary to return the handle to its central position when the pivot engaged by the hook may be readily disengaged and the chain removed from the object. While I have shown each of the slots 23—28 as continuous, it will be obvious that they may be modified in this respect without departing from my invention.

In that form of device shown in Figs. 6 and 7 the fulcrum support and the chain are as heretofore described with reference to the other modification, but the means for operating the device, while embodying the same broad principle, is specifically different. In this modification the double triangular link members 26 give place to angularly movable link members 41—42, of which the former consists of a pair of curved links pivoted to the short arm of the lever on opposite sides thereof by a pin and slot connection 43—44, and to the hook member by a pin 40′, upon the ends of which they are mounted intermediate the body of the hook and the fulcrum supports. The member 42 is formed with an enlarged barrel 43 centrally bored for the reception of the pin 34′ which together with the pin 40′ is mounted to slide in the slots 23′ of the fulcrum supports. In this modification the short arm of the lever is bifurcated providing a slot or opening 45 between the forks 46—46 and within this slot upon the pin 43, before mentioned, is pivoted the upper end of the link 42, there being a slot 47 formed therein to receive the pivot and permit lost motion as is the case with the links 41. It will be seen that lost motion is provided between the links 41 and 42, the lever and the fulcrum supports both by the slots 44—47 in the links and the slots 16′, dotted lines Fig. 6, in the fulcrum support, but it will be obvious that sufficient lost motion could be provided in the slots 44—47, if desired. The operation of this modification as thus far described is obvious in view of what has been said with reference to the earlier described form of wrench. Movement of the handle in either direction throws the short end of the lever in the opposite direction whereupon the link on the side toward which it moves swings idly upon its pivot but the link on the other side is engaged by the pin 43 and draws the chain tightly about the pipe or other object being manipulated. To reverse the rotation of the pipe it is only necessary to swing the handle in the opposite direction as before described.

It will be obvious that with either of the forms of wrench described if the handle be swung far enough from its central position the pivot thereof runs down the slots in the fulcrum supports and a very powerful leverage is obtained to clamp the chain about the pipe.

In the modification shown in Figs. 6 and 7 is a further feature which is obviously applicable also to the earlier described modification. This feature consists in a longitudinal adjustment of the fulcrum of the lever, its object being to secure a greater gripping power when the device is used with small pipe. In the illustrative example this adjustment is secured by means of an eccentric construction, though other constructions may obviously be used to obtain the same result. In the form shown the hub of the lever is provided with a counterbore much larger than that of the device of Figs. 1 to 5 inclusive which bore receives a cylindrical body 49 eccentrically bored to receive a pin or pivot 15′ extending through the slots 16′ in the fulcrum supports and provided at its opposite ends with a head 17′ and nut 18′ respectively, as in the earlier described modification. By rotating the cylindrical member 49 the fulcrum pivot 15′ may be caused to approach or recede from the end of the short arm of the lever and the adjustment of the cylinder member may be effected in a variety of ways though in the present instance I have shown the lever as centrally slotted or kerfed at 50, and provided with a knurled hand wheel 51 which may be secured in adjusted position by a spring 52 secured to the handle at 53 and engaging near its outer end as at 54 one of a plurality of notches formed in the periphery of the wheel.

By adjusting the length of the short arm by means of this fulcrum construction the grip of the wrench upon the object manipulated may be varied within considerable limits, and the tool accommodated to larger or smaller pipe.

As heretofore stated the particular forms described are merely illustrative of my invention and I do not wish to be confined to them but on the contrary my invention is to be measured by the following claims.

I claim:

1. In a chain wrench, a lever, a support on which the lever is fulcrumed adapted to engage a pipe, a chain connected with both lever and support at one end, and means for connecting it to both lever and support at another point in its length.

2. In a device of the class described, a lever, a fulcrum support therefor adapted to engage a pipe, a chain, lost motion connections between the one end of the chain and the lever and support respectively, means for grasping the chain at another point in its link and lost motion connections between said means and the lever and support respectively.

3. In a pipe wrench, a lever, a support to which the lever is fulcrumed adapted to engage the object to be manipulated, a chain connected at one end by a pin and slot connection to the fulcrum support and by a lost motion connection to the lever, means for engaging the chain at another point connected by pin and slot connections to the fulcrum support and by lost motion connections to the lever.

4. In a pipe wrench, a lever, a support to which the lever is fulcrumed adapted to engage the object to be manipulated, a chain connected at one end by a pin and slot connection to the fulcrum support and by a link to the lever, means for engaging the chain at another point connected by pin and slot connections to the fulcrum support and by a link to the lever.

5. In a pipe wrench, a lever, a support to which the lever is fulcrumed adapted to engage the object to be manipulated, a chain connected at one end by a pin and slot connection to the fulcrum support and by a slotted link to the lever, means for engaging the chain at another point connected by pin and slot connections to the fulcrum support and by a slotted link to the lever.

6. In a chain wrench, a lever, a slotted support in the slot of which the lever is fulcrumed, a chain having lost motion connections at one end to the lever and support, a chain engaging device likewise having lost motion connections to the lever and support respectively.

7. In a chain wrench comprising a lever, a slotted support within a slot of which the lever is fulcrumed, a chain one end of which is connected to the lever and to the support by a pin and slot connection and a chain engaging device likewise connected to the lever and support by a pin and slot connection.

8. In a pipe wrench, a lever, a pair of supports between which the lever is fulcrumed, a chain having one end thereof pivoted between the supports by a pin and slot connection, a chain engaging device likewise pivoted between the supports by a pin and slot connection, slotted link connections between the end of the chain and the chain engaging means respectively and the lever.

9. In a pipe wrench, a chain, a lever, a pair of supports between which the lever is fulcrumed each provided with a transverse slot, a pair of pivots within the slots one connected to the end of the chain and the other carrying a chain engaging means and lost motion connections between the pivots and the lever.

10. In a pipe wrench, a chain, a lever, a pair of supports between which the lever is fulcrumed each provided with a transverse slot, a pair of pivots within the slots one connected to the end of the chain and the other carrying a chain engaging means and slotted link connections between the pivots and the lever.

11. In a pipe wrench, a chain, a slotted fulcrum support and a lever pivoted between the supports, a pivot on the chain extending into the slots in the supports, a link connecting the pivot to the lever, a chain engaging device having a pivot likewise engaging a support and a slotted link pivoted to the chain engaging device and to the lever.

12. In a pipe wrench, a lever, a pair of slotted supports therefor, a chain pivoted at one end in the slots of the supports, a chain engaging means also pivoted in the slots and lost motion connections between the lever, chain and engaging means respectively.

13. In a pipe wrench, a chain, a lever, supports between which the lever is pivoted, transverse slots in the lower ends of the supports one end of the chain provided with a pivot extending into said slots and connected by a slotted link with the lever, a chain engaging device having a pivot also engaging the slots and provided with a slotted link engaging the lever.

14. In a chain wrench, a lever the short arm of which is bifurcated, slotted fulcrum supports, a pivot mounted in the slots of the supports and connected to said lever by a link extending into and pivoted within the opening between the forks thereof, a chain engaging hook also pivoted in the slots in the supports, a pair of slotted links arranged on opposite sides of and engaging the short arm of the lever and pivoted to the hook pivot, a chain secured at one end to the pivot in the slots in the supports.

15. In a device of the class described, a chain, a lever, fulcrum supports between which the lever is pivoted, lost motion connections between the chain and the supports and lever respectively, a chain engaging means, lost motion connections between same and the supports and lever respectively the fulcrum of the lever being adjustable lengthwise thereof to adjust the leverage.

16. In a pipe wrench, the combination of a chain, supports, lost motion connections between the chain and supports, a chain engaging means, lost motion connections between such means and the supports, a lever, a revoluble bearing cylinder extending transversely thereof, a pivot pin eccentrically mounted within the cylinder and engaging the supports, means for rotating and securing the cylinder and lost motion connections between the chain engaging means and the chain respectively and the lever.

17. In a chain wrench, the combination of a chain, a lever of the first order and a fulcrum support, the chain being attached to the support at one end and to the lever at the other, a cylinder 49 revolubly mounted in the fulcrum support, and a pivot 15' eccentrically mounted in the cylinder and about which the lever is pivoted, a hand wheel 51 rigid with the cylinder and by which the latter is turned, and a spring catch 52 engaging the hand wheel to hold it in adjusted position.

MAXIM A. DUQUETT.

Witnesses:
  John M. McCabe,
  Earle Peters.

---

Copies of this patent may be obtained for five cents each, by addressing the "Commissioner of Patents, Washington, D. C."